Figure 1:
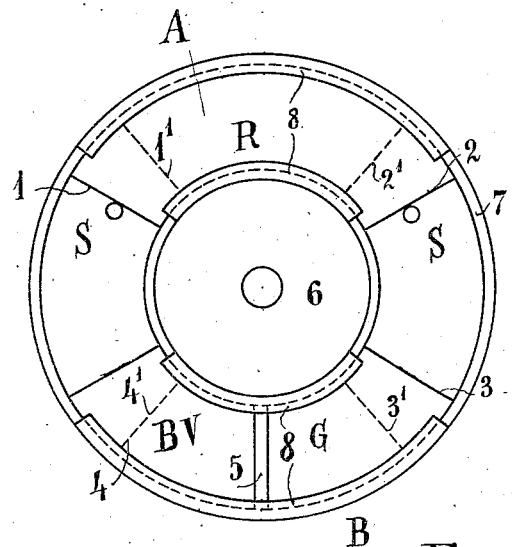

E. ZOLLINGER & S. MISCHONSNIKY.
MOTION PICTURE COLOR FILTER.
APPLICATION FILED DEC. 2, 1912.

1,203,681.

Patented Nov. 7, 1916.

Witnesses:
B. Sommers
E. Leckert.

Inventors:
Ernesto Zollinger,
Simon Mischonsniky,
By Henry Orth Jr.
Atty.

UNITED STATES PATENT OFFICE.

ERNEST ZOLLINGER AND SIMON MISCHONSNIKY, OF TURIN, ITALY.

MOTION-PICTURE COLOR-FILTER.

1,203,681. Specification of Letters Patent. Patented Nov. 7, 1916.

Application filed December 2, 1912. Serial No. 734,549.

*To all whom it may concern:*

Be it known that we, ERNEST ZOLLINGER, a citizen of Switzerland, and SIMON MISCHONSNIKY, a subject of the Emperor of Russia, both residents of Turin, Italy, have invented certain new and useful Improvements in Motion-Picture Color-Filters; and we do hereby declare the following to be a full, clear, and exact description of the invention, such as will enable others skilled in the art to which it appertains to make and use the same.

This process of cinematography in colors is carried out by taking successively two pictures through two groups of color filters, and afterward projecting positives of said images through the same filters. Up to the present time this has been done by two projections, one through a positive image and its pertaining screen, *i. e.* this positive image is a print from a negative taken through a like or similar screen; and the other projection through a second positive image and its pertaining color screen, *i. e.*, this second positive is a print from a negative taken through a like or similar screen. Now, according to our invention, we also use two pictures and make one or both negatives by successive exposures through successive color screens, and consequently the print or positive used in projecting said image is but a single positive projected through the same or similar color screens used in making the single negative from which said positive was made.

The group used for taking the first image or impression may be composed of several filters, each of them having its complement in the second group of filters, or we may use a single filter for taking the first image or impression, and a group of filters for the second image or impression, the whole being complementary. We may also take the first image through a group of filters and the other image through a single complementary filter.

The number of filters of one group is not necessarily equal to that of the second group, but each group must be complementary to the other group or to the filter. Thus, for instance, we may take an exposure through a group of filters, say—yellow—orange - yellow — and another through a group—green-blue—blue-violet.

In taking the pictures it will be found convenient to use the green-blue and blue-violet filters in such proportion that a difference of opacity or density will be produced between the impression due to the green screen and the impression due to the blue-violet ones obtained in the same field.

The groups of filters are suitably arranged in form of sectors opposite to each other, and are revolved so that each complete rotation corresponds to two successive exposures, each exposure being made during the passage of one of the two sectors.

This invention has the advantage that, in taking the pictures, it is possible to vary the time for each exposure according to the sensitiveness of the panchromatic film to the different colors. This becomes necessary because the panchromatic film varies in sensitiveness, most marked by the green and blue-violet. This variation is dependent upon the weather, time, place, temperature &c. (see R. Namias, "*Processi odierni per la fotografia dei colori*," pp. 103–104, and also "*Jahrbuch für Photographie und Reproduktionstechnik für das Jahr 1911*," page 53). Therefore these screens, according to our invention are made adjustable for color values.

An experiment was made by us, by taking the picture by a cinematographic camera, provided with a shutter allowing two exposures at each turn of the disk carrying the two sectors. During the first exposure, the image was taken through the first sector, constituted by the red screen, allowing all the red lines of the spectrum and a few of the yellow ones to pass; during the second exposure the image was taken through the second sector constituted by two successive filters, one being green and the other blue-violet, allowing all the spectrum lines to pass, with the exception of those passing through the first sector. This second image has, moreover, two maxima of opacity corresponding to the characteristics of the green and blue-violet filters.

The invention will be readily understood by the aid of the accompanying drawing, in which—

Figure 2:
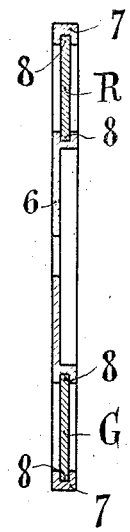
Figure 3:
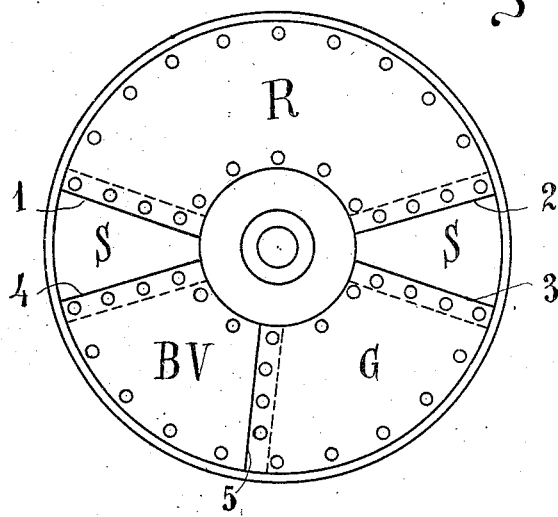

Figure 1 is an elevation of the disk carrying the filters and shutters used in taking the images. Fig. 2 is a section on the line A—B Fig. 1, and Fig. 3 is an elevation of the disk used in projecting the images.

The system of filters and shutter parts is constituted by a disk 6 and a ring 7, both provided on opposite sections with grooves 8 and connected together by means of two opaque sectors S, constituting the shutters. The filters are fitted in the grooves 8 and held therein; the red filter 1—2, is immovable, while the green filter, 3—5, and blue-violet filter, 5—4, are adjacent one another and constitute the group for the second image, and may be caused to slide along their groove, so that in the constant area free to the passage of the luminous rays comprised between the ends 3′—4′ of the shutters, the proportion of the area of said two filters may be varied. The system of filters and shutter for projecting the image also has two opaque parts S, separating the two opposite groups of filters, one red filter R, and the other green filter G and the blue-violet filter BV. In this system all filters are immovable. The negative thus obtained is then printed to produce a positive print or picture.

This invention also embraces the taking of two exposures successively through two groups of complementary filters and allowing all the spectrum rays to pass.

By means of the well-known tri-color process it is possible to localize the three fundamental colors, but three exposures are required, and the di-chrome process, in which only the colors red and green are used, reproduce only the objects which are not blue or blue-violet, namely only the green and red objects and all the half tones between them.

We claim—

In a motion picture apparatus, means comprising a plurality of color filter areas adapted to pass successively across the path of light, at least one of said areas consisting of a group of adjustable, different color filters, so as to permit a relative variation of area between the filters of said group.

In testimony that we claim the foregoing as our invention, we have signed our names.

ERNEST ZOLLINGER.
SIMON MISCHONSNIKY.